(12) United States Patent
DeBalko

(10) Patent No.: US 6,282,277 B1
(45) Date of Patent: *Aug. 28, 2001

(54) UNBUNDLING DEVICE AND METHOD FOR CONNECTING A COMPETING LOCAL EXCHANGE CARRIER (CLEC) TO THE SUBSCRIBER LOOP OF A LOCAL EXCHANGE CARRIER (LEC)

(75) Inventor: George Andrew DeBalko, Long Valley Township Morris County, NJ (US)

(73) Assignee: Avaya Technology Corp., Basking Ridge, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/980,237

(22) Filed: Nov. 28, 1997

(51) Int. Cl.$^7$ ............................................ H04M 3/42
(52) U.S. Cl. ........................ 379/201; 379/243; 379/221
(58) Field of Search ............................... 379/201, 219, 379/220, 221, 224, 225, 229, 258, 333, 334, 335, 120, 243, 156

(56) References Cited

U.S. PATENT DOCUMENTS

| | | | | |
|---|---|---|---|---|
| 3,803,360 | * | 4/1974 | Morstadt | 379/93.07 |
| 4,197,427 | * | 4/1980 | Hutcheson et al. | 379/133 |
| 4,887,295 | * | 12/1989 | Jenkins | 379/362 |
| 5,287,344 | * | 2/1994 | Bye et al. | 370/225 |
| 5,341,415 | * | 8/1994 | Baran | 379/201 |
| 5,408,525 | * | 4/1995 | Eldering | 379/162 |
| 5,563,938 | * | 10/1996 | Soshea et al. | 379/201 |
| 5,673,255 | * | 9/1997 | Dunn et al. | 370/244 |
| 5,715,305 | * | 2/1998 | Penzias et al. | 379/220 |
| 5,784,449 | * | 7/1998 | Ardon | 379/230 |
| 5,903,639 | * | 5/1999 | Lipchock et al. | 379/220 |
| 6,072,793 | * | 6/2000 | Dunn et al. | 370/352 |
| 6,160,880 | * | 12/2000 | Allen | 379/207 |

* cited by examiner

Primary Examiner—Fan Tsang
Assistant Examiner—Roland G. Foster
(74) Attorney, Agent, or Firm—Thomas J. Bean; Ryan, Mason & Lewis, LLP

(57) ABSTRACT

An unbundling demarcation device (UDD) is disclosed for disconnecting the equipment of a local exchange carrier (LEC) from a subscriber in order to permit a competing local exchange carrier (CLEC) to provide local service to the subscriber. The unbundling demarcation device (UDD) and related CLEC equipment may be positioned at any point in the subscriber loop, between the LEC switch and the subscriber equipment. The unbundling demarcation device (UDD) is an electro-mechanical or electro-optical coupling device, such as a sensitive relay, a latching relay, a switching mechanism or a solid state device that simulates a relay. The unbundling demarcation device (UDD) connects the LEC equipment to the CLEC equipment when a voltage or other trigger signal is applied to the subscriber loop by the LEC. When the voltage is removed from the subscriber loop, or when a deactivating signal is sent, the unbundling demarcation device (UDD) will open circuit or decouple, preventing the LEC from accessing the subscriber equipment and allowing the CLEC to access the subscriber. The unbundling demarcation device (UDD) can be utilized to determine whether there is a fault in the subscriber loop up to and beyond the unbundling demarcation device (UDD). With no voltage applied, the unbundling demarcation device (UDD) disconnects the CLEC equipment, and the LEC can evaluate the subscriber loop all the way to the unbundling demarcation device (UDD). With the voltage applied, the LEC can evaluate the CLEC loop and customer equipment for faults as well. Unlike electronic MTUs, the unbundling demarcation device (UDD) does not present a lossy device when deactivated.

26 Claims, 4 Drawing Sheets

UNBUNDLING DEVICE AND METHOD FOR CONNECTING A COMPETING LOCAL EXCHANGE CARRIER (CLEC) TO THE SUBSCRIBER LOOP OF A LOCAL EXCHANGE CARRIER (LEC)

FIELD OF THE INVENTION

The present invention relates to a method and apparatus for connecting a competing local exchange carrier (CLEC) to a telephone subscriber, and more particularly, to a method and apparatus for unbundling the subscriber loop of a local exchange carrier (LEC) to permit access by a CLEC.

BACKGROUND OF THE INVENTION

In the United States, telephone service was historically provided almost exclusively by American Telephone and Telegraph, Inc. (now AT&T). Following the deregulation of the telephone industry in 1984, AT&T was limited to providing long distance telephone service, and local telephone service was thereafter provided by the Regional Bell Operating Companies (RBOCs), such as Bell Atlantic and Southern New England Telephone (now SNET). Thus, following deregulation, the Regional Bell Operating Companies (RBOCs) served as the exclusive local exchange carriers (LECs), and maintained the subscriber loop between the Public Switched Telephone Network (PSTN) and each individual telephone subscriber. As competition in all segments of the telephone industry increases, however, non-Bell companies are poised to provide local telephone service.

In order to permit competition in the local telephone market, the Regional Bell Operating Companies (RBOCs) must unbundle their subscriber loop, such that the Competing Local Exchange Carriers (CLECs) can access the subscriber. The tin bundling can occur at any point in the subscriber loop, between the LEC's Central Office and the subscriber's equipment. Currently, the LEC or CLEC must manually rewire the subscriber loop, to permit CLEC access. Depending on the location of the CLEC equipment, the subscriber's loop may be connected at the Central Office end or at the subscriber's end. If the CLEC's equipment is merely bridged on the LEC's loop, the resulting bridged cable and battery will undoubtedly cause transmission problems. Although some form of connection will have to be made at the point of the CLEC connection, the LEC is typically unwilling to permit the CLEC to modify the LEC's equipment at the subscriber facility. Thus, the LEC currently must dispatch a technician to the subscriber site to disconnect the LEC's loop, thereby incurring significant labor costs.

As apparent from the above-described deficiencies with conventional systems for unbundling subscriber loops, a need exists for a low-cost device that permits a LEC to remotely and selectively disconnect a subscriber loop when the subscriber elects to utilize a CLEC for local telephone service. A further need exists for an unbundling device that does not interfere with telephone signals or subscriber equipment and disconnects the LEC equipment even in the presence of a fault with CLEC or subscriber equipment. Yet another need exists for an unbundling device that allows the LEC to test the subscriber loop up to and beyond the demarcation point, where the CLEC accesses the LEC's subscriber loop.

SUMMARY OF THE INVENTION

Generally, in accordance with one aspect of the invention, an unbundling demarcation device (UDD) is disclosed to disconnect the equipment of a local exchange carrier (LEC) from a subscriber in order to permit a competing local exchange carrier (CLEC) to provide local service to the subscriber. The unbundling demarcation device (UDD) and related CLEC equipment may be positioned at any point in the subscriber loop, between the LEC switch and the subscriber equipment. The unbundling demarcation device (LDD) is embodied as an electro-mechanical or electro-optical coupling device, such as a sensitive relay, a latching relay or a switching mechanism, that transparently connects the LEC equipment to the CLEC equipment when an appropriate control signal is applied to the subscriber loop by the LEC. The control signal may be an electrical or optical signal, including a DC voltage or a trigger signal. When the DC voltage is removed from the subscriber loop, or when the appropriate deactivating control signal is applied to the loop, the unbundling demarcation device (UDD) will open circuit or decouple, preventing the LEC from accessing the subscriber equipment and allowing the CLEC to access the subscriber.

The LEC should be able to test and maintain their facilities up to the point of connection with the CLEC. Thus, according to a further aspect of the invention, the unbundling demarcation device (UDD) operates as a maintenance termination unit (MTU) and can be utilized to determine whether there is a fault in the subscriber loop, up to and beyond the unbundling demarcation device (UDD). By placing an unbundling demarcation device (UDD) at the point of the CLEC connection, the LEC can maintain and test its portion of the loop with or without the UDD activated by the LEC test equipment. Specifically, with no voltage applied or the UDD deactivated, the unbundling demarcation device (UDD) disconnects the CLEC equipment from the LEC equipment and exchange facility, and the LEC can evaluate the subscriber loop all the way to the unbundling demarcation device (UDD). With the voltage applied or the UDD activated, the LEC can evaluate the CLEC loop and customer equipment for faults as well. Unlike electronic MTUs, the unbundling demarcation device (UDD) is not a lossy device when in the deactivated state.

A more complete understanding of the present invention, as well as further features and advantages of the present invention, will be obtained by reference to the following detailed description and drawings.

DETAILED DESCRIPTION

Figure 1:
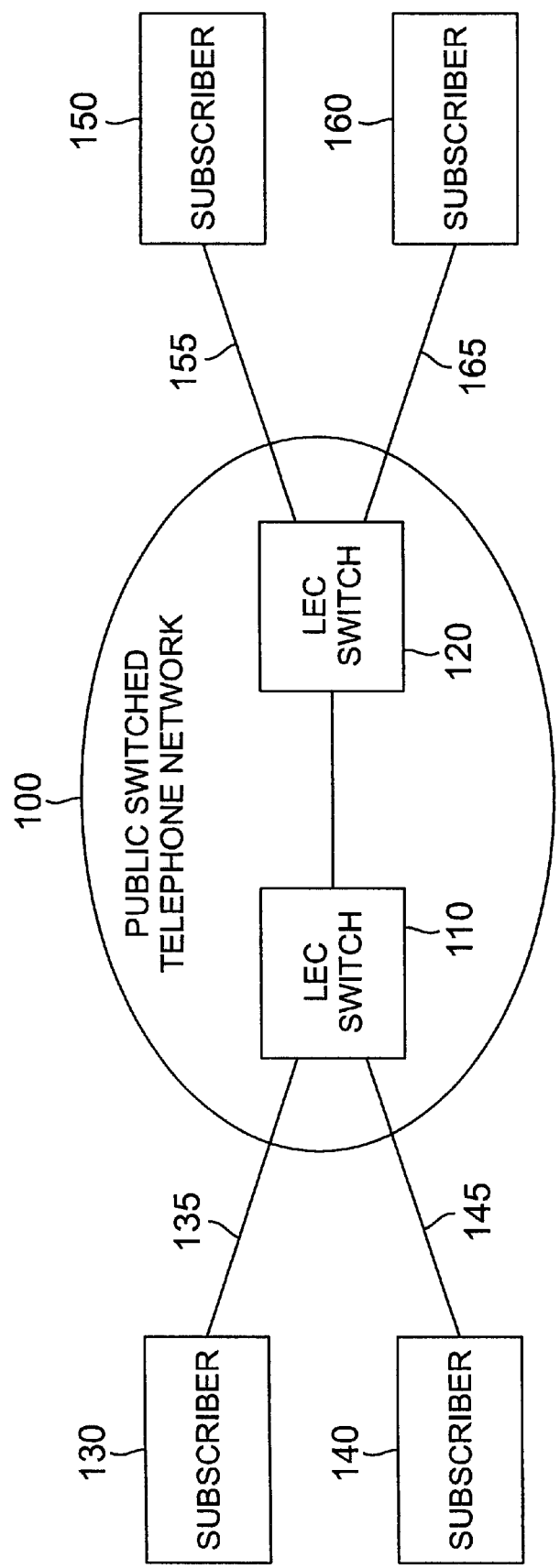
FIG. 1 is a block diagram of the conventional Public Switched Telephone Network (PSTN) for interconnecting a plurality of subscribers.

FIG. 1 is a block diagram illustrating the conventional Public Switched Telephone Network (PSTN) 100. As shown in FIG. 1, the Public Switched Telephone Network (PSTN) 100 interconnects a plurality of subscribers 130, 140, 150, 160 by means of a plurality of telephone switches 110, 120, such as the 5ESS® switch, manufactured by Lucent Technologies Inc. of Murray Hill, N.J., operated by one or more local exchange carriers (LECs). Each subscriber 130, 140, 150, 160 is connected to the corresponding LEC switch, such as switches 110, 120, by means of a subscriber loop 135, 145, 155, 165, such as a twisted pair. A twisted pair consists of a ring line and a tip line, in a known manner. As previously indicated, if a subscriber, such as subscriber 160, elects to utilize a competing local exchange carrier (CLEC) for local service, the corresponding LEC 120 must unbundle the subscriber loop 165 to permit CLEC access.

Figure 2A:
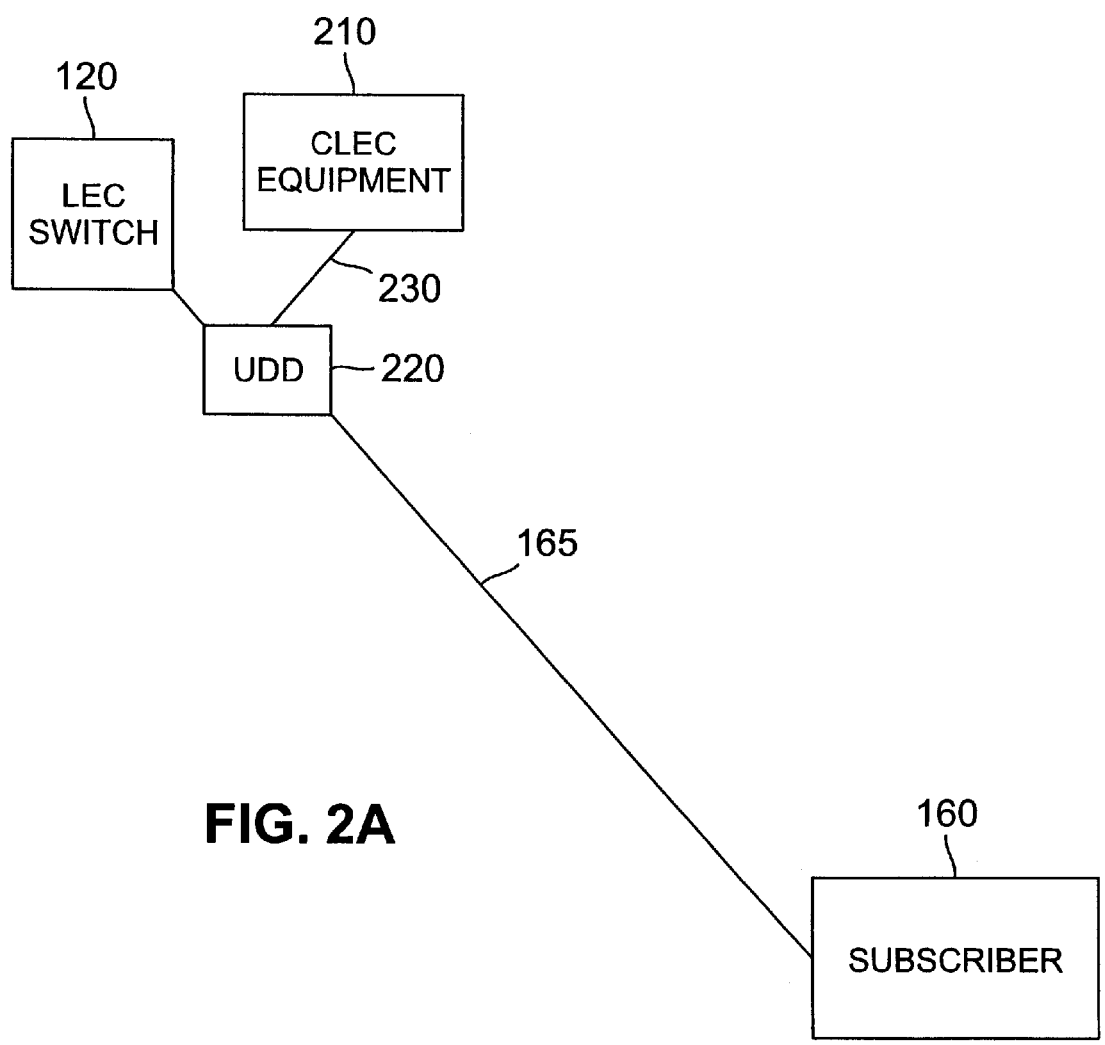
FIG. 2A is a block diagram illustrating the interconnection of CLEC equipment in the vicinity of the LEC switch of FIG. 1 by means of an unbundling demarcation device (UDD) according to the present invention.
Figure 2B:
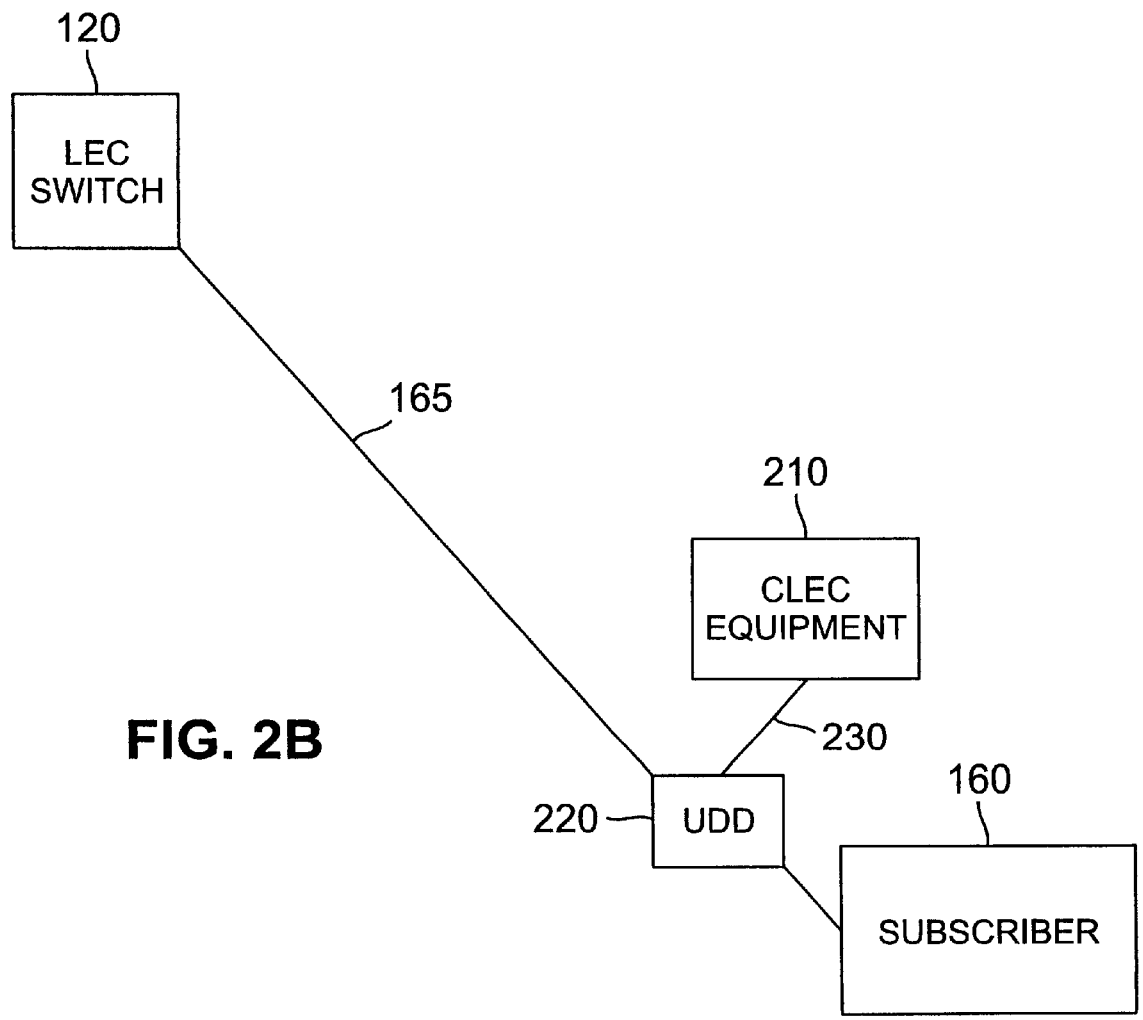
FIG. 2B is a block diagram illustrating the interconnection of CLEC equipment in the vicinity of the subscriber site of FIG. 1 by means of an unbundling demarcation device (UDD) according to the present invention.

According to a feature of the present invention, the LEC 120 utilizes an unbundling demarcation device (UDD) 220, discussed further below in conjunction with FIGS. 2A, 2B and 3, to disconnect the LEC's equipment 120 from the subscriber 160 and to permit a CLEC 210 (FIGS. 2A and 2B) to provide local service to a subscriber 160. As shown in FIGS. 2A and 2B, the CLEC equipment 210 may be connected to the subscriber 160 by means of a CLEC twisted pair 230 and the unbundling demarcation device (UDD) 220. The unbundling demarcation device (UDD) 220 and related CLEC equipment 210 may be positioned in the vicinity of the LEC switch 120, as shown in FIG. 2A, or positioned in the vicinity of the subscriber 160, as shown in FIG. 2B. As discussed further below in conjunction with FIG. 3, the unbundling demarcation device (UDD) is embodied as an electromechanical or electro-optical coupling device, such as a sensitive relay, a latching relay or a switching mechanism, that transparently connects the LEC equipment 120 to the CLEC equipment 210 when an appropriate control signal is applied to the subscriber loop 165 by the LEC switch 120. The control signal may be an electrical or optical signal, including a DC voltage, for example, the 48 volts present in the well known Plain Old Telephone Service (POTS) system or a Private Branch Exchange (PBX) system, or a trigger signal, for example, in a network that does not exhibit a battery feed, such as an Integrated Services Digital Network (ISDN). An optical control signal may be generated, for example, by an infrared light emitting diode (IR LED). The LEC equipment 120 is disconnected from the CLEC equipment 210 when an appropriate voltage or other deactivating control signal is applied to the subscriber loop 210 by the LEC switch 120.

In the event the LEC removes the voltage from the subscriber loop 165, or when a deactivating control signal is applied, the unbundling demarcation device (UDD) 220 will open circuit or decouple, and prevent the LEC from accessing the subscriber equipment and allow the CLEC to access the subscriber 160. In order to prevent "ring trip," where an insufficient amount of current on the twisted pair 165 causes the line to be answered (or to appear busy) when not wanted, or transmission impairment problems, such as low volume or poor signal strength, the current drawn by the unbundling demarcation device (UDD) 220 when in the activated state should be limited. According to one feature of the invention, the operation of the unbundling demarcation device (UDD) 220 is independent of the condition of the CLEC loop 230 or subscriber equipment 160.

According to a further feature of the invention, the unbundling demarcation device (UDD) 220 operates as a maintenance termination unit (MTU) and can be utilized to determine whether there is a fault, such as a short or open sufficient to cause transmission problems, in the subscriber loop 165 up to and beyond the unbundling demarcation device (UDD) 220. A maintenance termination unit (MTU) is a well known fault sectionalization device used by the LEC on a subscriber loop to determine the location of a fault at a point on the subscriber loop 165 relative to the location of the respective maintenance termination unit (MTU). Specifically, with the UDD deactivated, the unbundling demarcation device (UDD) 220 disconnects the subscriber 160 and CLEC equipment 210, and the LEC 120 can evaluate the subscriber loop 165 all the way to the unbundling demarcation device (UDD) 220. With the UDD activated, the LEC 120 can evaluate the CLEC loop 230 and customer equipment 160 for faults as well. The unbundling demarcation device (UDD) 220 is preferably an electrically passive device. Thus, the unbundling demarcation device (UDD) 220 is effectively transparent to the subscriber loop 165 when deactivated, unlike conventional MTUs whose presence in the subscriber loop 165 is not at all transparent.

Figure 3:
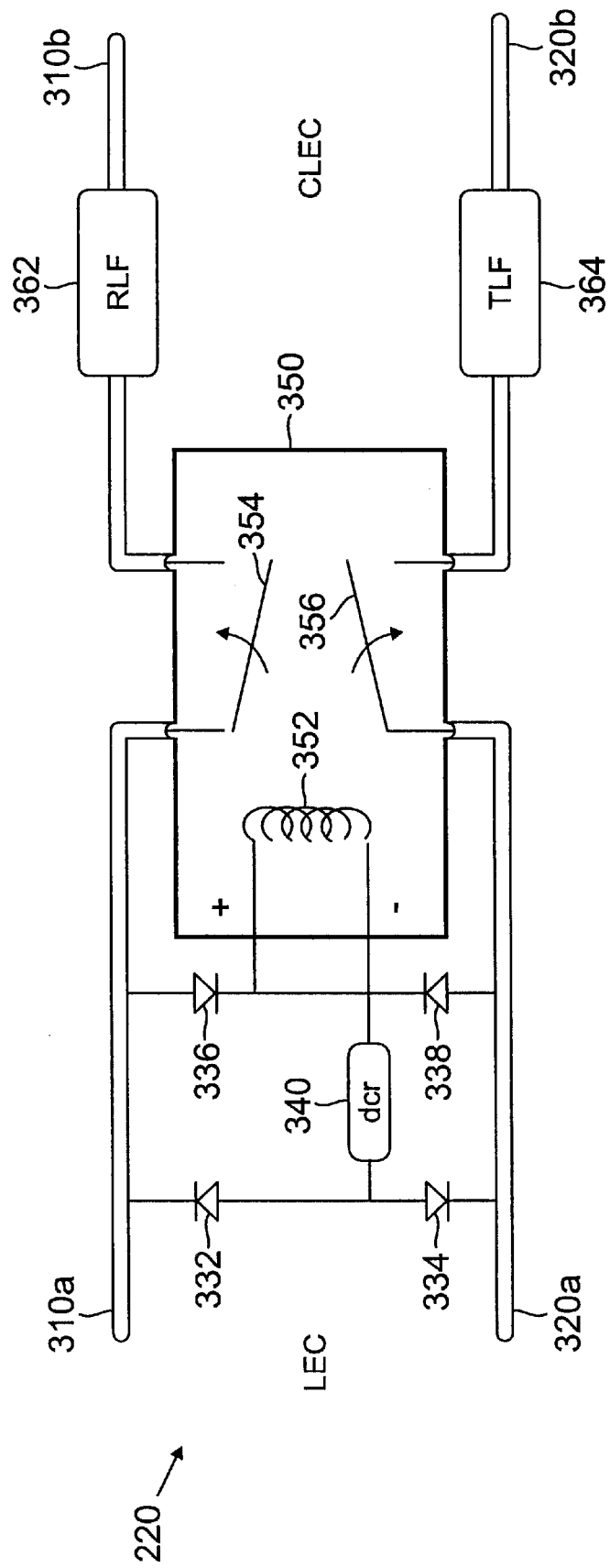
FIG. 3 is a schematic diagram illustrating one embodiment of the unbundling demarcation device (UDD) of FIGS. 2A and 2B.

The preferred embodiment of the unbundling demarcation device (UDD) 220 is shown in FIG. 3. As shown in FIG. 3, the ring line 310a and tip line 320a of the twisted pair provided by the LEC will be connected to the ring line 310b and tip line 320b of the twisted pair provided by the CLEC, if an appropriate voltage or trigger signal is applied by the LEC across the lines 310a, 320a. For a POTS system, for example, the appropriate voltage may be 48 volts (±6V). For a POTS implementation, the unbundling demarcation device (UDD) 220 includes a sensitive 48 Volt relay 350 with contacts 354, 356 that close when an appropriate amount of dc current (on the order of 200 µA) flows from the LEC, for example, from a battery or other power source. In an alternate implementation, particularly suitable for network environments that do not exhibit a battery feed, such as an Integrated Services Digital Network (ISDN), the unbundling demarcation device (UDD) 220 may be embodied as a latching relay. The ISDN network is a global telecommunication service that uses digital transmission and switching technology to support voice and digital data communication.

A suitable sensitive 48 Volt relay is commercially available from Electrol Inc., of Saugus, Calif. In the illustrative POTS implementation, the DC resistance of the relay pickup coil 352 is preferably approximately 100 Kohms through a polarity bridge 332, 334, 336, 338. The polarity bridge 332, 334, 336, 338 allows operation in either polarity, thereby permitting operation of the unbundling demarcation device (UDD) 220, for example, if the wires 310a, 320a are cut and repaired with an opposite polarity. As noted above, the unbundling demarcation device (UDD) 220 may alternatively be embodied as a latching relay. Typically, a latching relay is activated and deactivated by voltage signals of opposite polarities or other appropriate activation and deactivation control signals. When the latching relay is activated and deactivated by voltage signals of opposite polarities, the polarity bridge should be removed from the unbundling demarcation device (UDD) 220. A current limiting resistor 340 provides an appropriate impedance to prevent the current drawn by the relay pick-up coil 352 from creating a "ring trip" condition, in a known manner.

In addition, the unbundling demarcation device (UDD) 220 preferably includes a ring line feed resistor 362 and a tip line feed resistor 364, each on the order of 20 ohms, to allow the unbundling demarcation device (UDD) 220 to operate even if the CLEC loop or subscriber equipment is shorted or grounded. The ring line feed resistor 362 and tip line feed resistor 364 also reduce the fault current to prevent lightning and other electrical surges from damaging the unbundling demarcation device (UDD) 220, as well as the CLEC loop and subscriber equipment.

It is to be understood that the embodiments and variations shown and described herein are merely illustrative of the principles of this invention and that various modifications may be implemented by those skilled in the art without departing from the scope and spirit of the invention. For example, although the invention has been illustrated herein using a relay or a latching relay, solid state devices which simulate such relays, such as a maintenance termination unit (MTU), could be utilized as well, as would be apparent to a person of ordinary skill in the art to which the invention belongs.

I claim:

1. A method of connecting a competing local exchange carrier (CLEC) to a subscriber loop between a local exchange carrier (LEC) and a subscriber, said method comprising the steps of:

selectively applying a control signal from said LEC on said subscriber loop; and connecting said CLEC to said subscriber loop by means of a coupling device, said coupling device positioned remotely from said subscriber such that said subscriber may be selectively connected to said LEC or said CLEC using a single subscriber loop between said subscriber and said coupling device, said coupling device operative to selectively disconnect said LEC when said subscriber elects to utilize said CLEC, said control signal applied to said loop by said LEC until a deactivating control signal is applied to said loop by said LEC.

2. The method according to claim 1, further comprising the step of ensuring said control signal may be applied under either polarity.

3. The method according to claim 1, wherein said subscriber loop is part of a POTS or PBX system, and said control signal is approximately 48 volts.

4. The method according to claim 1, wherein said subscriber loop is part of an ISDN system, and said control signal is a trigger signal.

5. The method according to claim 1, further comprising the step of limiting resistor current through said coupling device to prevent the occurrence of a ring trip condition.

6. The method according to claim 1, wherein said coupling device and said competing local exchange carrier are connected to said subscriber loop at the premises of said subscriber.

7. The method according to claim 1, wherein said coupling device and said competing local exchange carrier are connected to said subscriber loop at the premises of said local exchange carrier.

8. An unbundling device for connecting a subscriber loop of a competing local exchange carrier (CLEC) to a subscriber loop of a local exchange carrier (LEC), each of said subscriber loops comprised of a twisted pair, said unbundling device comprising:

at least four connection points for interconnecting with said twisted pairs; and a coupling device connected between said connection points, said coupling device positioned remotely from said subscriber such that said subscriber may be selectively connected to said LEC or said CLEC using a single subscriber loop between said subscriber and said coupling device, said coupling device having a pair of contacts that close when said coupling device is activated by said LEC, said coupling device operative to selectively disconnect said LEC when said subscriber elects to utilize said CLEC, said control signal applied to said loop by said LEC until a deactivating control signal is applied to said loop by said LEC.

9. The unbundling device according to claim 8, further comprising a polarity bridge to ensure said unbundling device operates under either polarity of said control signal.

10. The unbundling device according to claim 8, wherein said subscriber loop is part of a POTS or PBX system, and said coupling device is activated by applying a voltage of approximately 48 volts.

11. The unbundling device according to claim 8, wherein said subscriber loop is part of an ISDN system, and said coupling device is activated by a trigger signal.

12. The unbundling device according to claim 8, further comprising a current limiting resistor to prevent the occurrence of a ring trip condition.

13. The unbundling device according to claim 8, further comprising line feed resistors for said twisted pair of said competing local exchange carrier to allow said unbundling device to operate in the presence of faults in equipment of said competing local exchange carrier or said subscriber.

14. The unbundling device according to claim 8, further comprising line feed resistors for said twisted pair of said competing local exchange carrier to reduce fault current in the presence of an electrical surge.

15. The unbundling device according to claim 8, wherein said coupling device and said competing local exchange carrier are connected to said subscriber loop at the premises of said subscriber.

16. The unbundling device according to claim 8, wherein said coupling device and said competing local exchange carrier are connected to said subscriber loop at the premises of said local exchange carrier.

17. The unbundling device according to claim 8, wherein said coupling device is activated by application of an appropriate voltage signal.

18. The unbundling device according to claim 8, wherein said coupling device is activated by application of an appropriate light signal.

19. The unbundling device according to claim 8, wherein said coupling device is activated by application of a trigger voltage.

20. A method of connecting a competing local exchange carrier (CLEC) to a subscriber loop between a local exchange carrier (LEC) and a subscriber, said method comprising the steps of:

selectively applying a relay control signal from said LEC on said subscriber loop; and connecting said CLEC to said subscriber loop when said subscriber elects to utilize said CLEC by means of a relay, said relay positioned remotely from said subscriber such that said subscriber may be selectively connected to said LEC or said CLEC using a single subscriber loop between said subscriber and said relay, said relay operative to selectively disconnect said LEC when said relay control signal is applied to said loop by said LEC until a deactivating control signal is applied to said loop by said LEC.

21. The method according to claim 20, further comprising the step of ensuring said control signal may be applied under either polarity.

22. The method according to claim 20, wherein said subscriber loop is part of a POTS or PBX system, and said relay control signal is approximately 48 volts.

23. The method according to claim 20, wherein said subscriber loop is part of an ISDN system, and said relay control signal is a trigger signal.

24. The method according to claim 20, further comprising the step of limiting resistor current through said relay to prevent the occurrence of a ring trip condition.

25. The method according to claim 20, wherein said relay and said competing local exchange carrier are connected to said subscriber loop at the premises of said subscriber.

26. The method according to claim 20, wherein said relay and said competing local exchange carrier are connected to said subscriber loop at the premises of said local exchange carrier.

* * * * *